Sept. 11, 1945.   N. H. JANES   2,384,681
INTAKE MANIFOLD
Filed Aug. 3, 1943   2 Sheets-Sheet 1
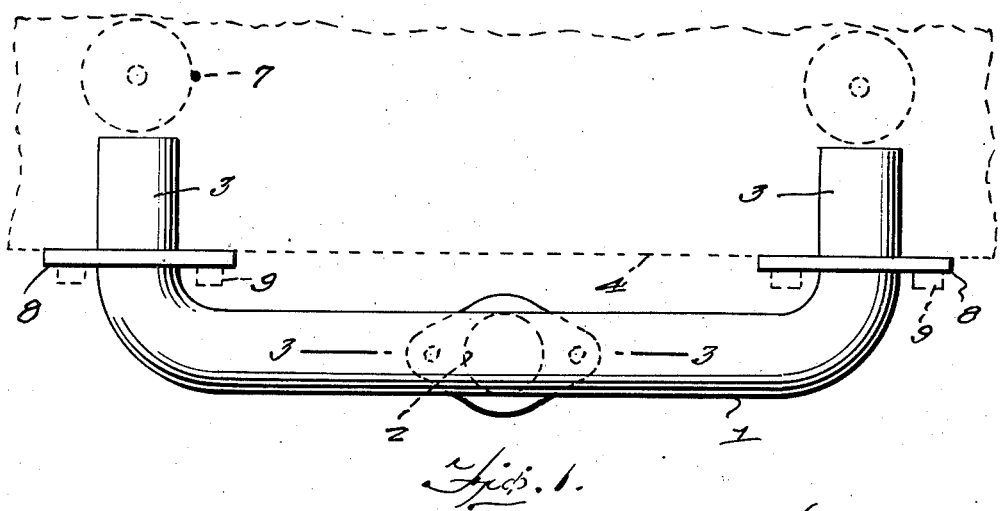
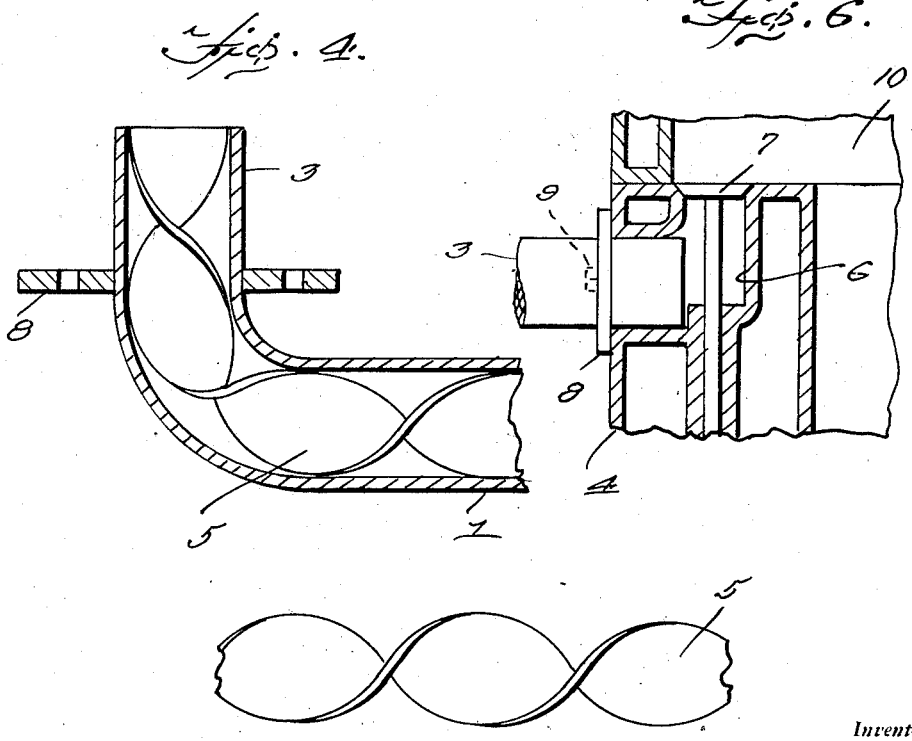
Inventor
Norman H. Janes

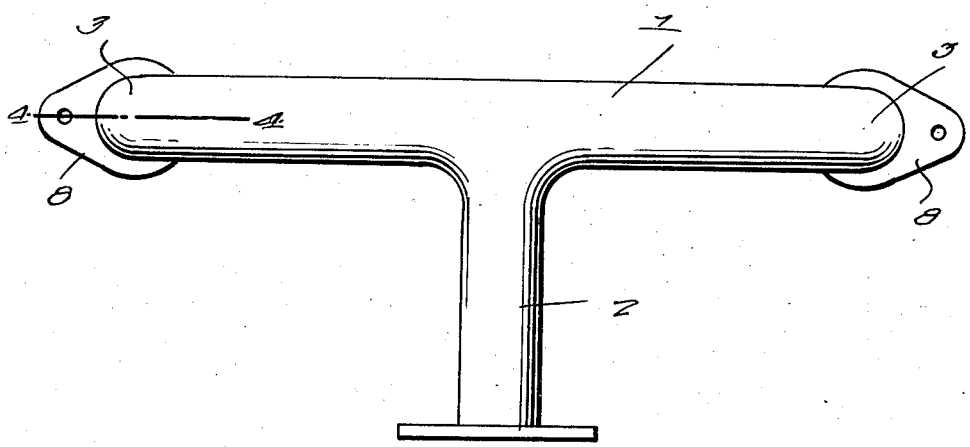
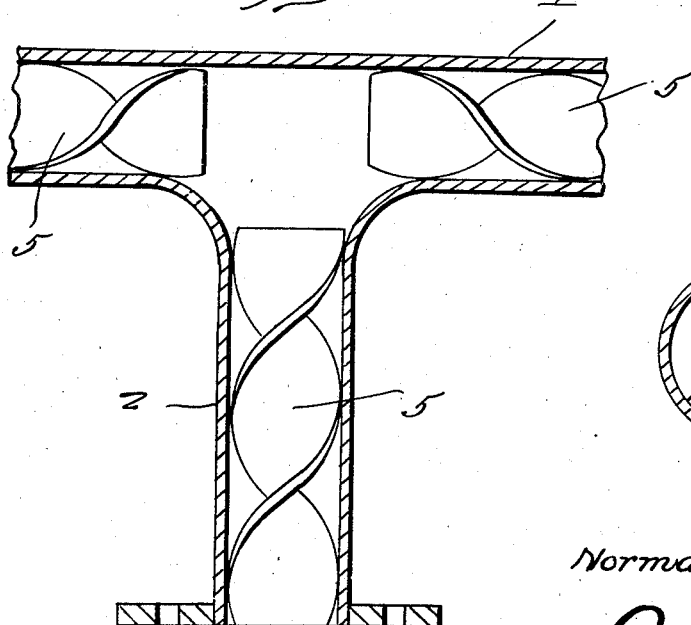
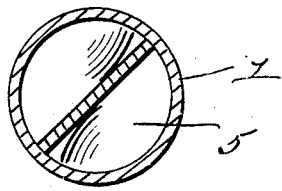

Patented Sept. 11, 1945

2,384,681

UNITED STATES PATENT OFFICE 2,384,681

INTAKE MANIFOLD

Norman Henry Janes, Snook, Tex.

Application August 3, 1943, Serial No. 497,201

1 Claim. (Cl. 123—142)

The present invention relates to new and useful improvements in intake manifolds for internal combustion engines, and has for its primary object to provide, in a manner as hereinafter set forth, a device of this character comprising unique means for thoroughly mixing the fuel between the carburetor and the engine.

Another very important object of the invention is to provide an intake manifold of the aforementioned character which is adapted to impart a rapidly whirling movement to the charge as it enters the combustion chamber of the engine.

Other objects of the invention are to provide an engine intake manifold of the character described which will be comparatively simple in construction, durable, highly efficient and reliable in use, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of an intake manifold constructed in accordance with the present invention.

Figure 2 is a view in side elevation of the device.

Figure 3 is a view in vertical section through the central portion of the manifold, taken substantially on the line 3—3 of Figure 1.

Figure 4 is a view in horizontal section through an end portion of the manifold, taken substantially on the line 4—4 of Figure 2.

Figure 5 is a cross-sectional view through the device.

Figure 6 is a view in vertical section through a portion of an engine, showing one of the branches of the manifold connected thereto.

Figure 7 is a detail view in elevation of a portion of one of the spiral members.

Referring now to the drawings in detail, it will be seen that the embodiment of the invention which has been illustrated comprises a conduit 1 having depending therefrom, at an intermediate point, an integral intake pipe 2 for connection in the usual manner with a carburetor. The conduit 1 terminates in laterally extending end portions constituting branches 3 for connection to the engine 4.

Mounted in the intake pipe 2, also in the conduit 1, are spirally twisted webs 5. As illustrated to advantage in Figure 4 of the drawings, the spiral webs 5 in the conduit 1 extend to the ends of the branches 3.

Referring now to Figure 6 of the drawings, it will be observed that the branches 3 of the manifold project into the intake valve chambers 6 of the engine 4 to a point closely adjacent the intake valves 7. Apertured flanges 8 are fixed on the branches 3 at points in spaced relation to the ends thereof, said flanges accommodating bolts 9 for firmly securing the manifold to the engine.

It is thought that the manner in which the invention functions will be readily apparent from a consideration of the foregoing. Briefly, as the fuel is drawn through the manifold from the carburetor, it is whirled rapidly by the spiral webs 5 and is thus thoroughly mixed. This whirling motion is continued until the fuel leaves the ends of the branches 3 closely adjacent the intake valves 7 and enters the combustion chambers 10 of the engine 4 from the intake valve chambers 6. In this manner the charge is caused to continue to whirl after it has entered the combustion chambers. This constitutes an important and highly desirable feature of the invention.

It is believed that the many advantages of an intake manifold constructed in accordance with the present invention will be readily understood, and although a preferred embodiment of the device is as illustrated and described, it is to be understood that changes in the details of construction may be resorted to which will fall within the scope of the invention as claimed. For example, the spiral webs 5 may, if desired, be integral with the portions 1, 2 and 3 of the manifold.

What is claimed is:

In combination, an intake manifold comprising a horizontal portion of U-shape in plan, and a straight vertical intake pipe, said horizontal portion embodying a straight horizontal conduit having straight horizontal branches extending laterally from the ends thereof and adapted to project into the engine in direct communication with the valve chambers of the latter, said intake pipe extending from and communicating with said conduit mid-way between the ends thereof, a spirally twisted web separate from and disposed in the intake pipe to extend the full length of the latter, and other similar spirally twisted webs separate from and disposed in the conduit and its branches, each of said other spiral webs extending from a different side of the connection of the intake pipe with the conduit to the free end of the adjacent branch.

NORMAN H. JANES.